May 27, 1947.  P. P. JOHNSON  2,421,332
QUICK DISCONNECT COUPLING
Filed May 16, 1945
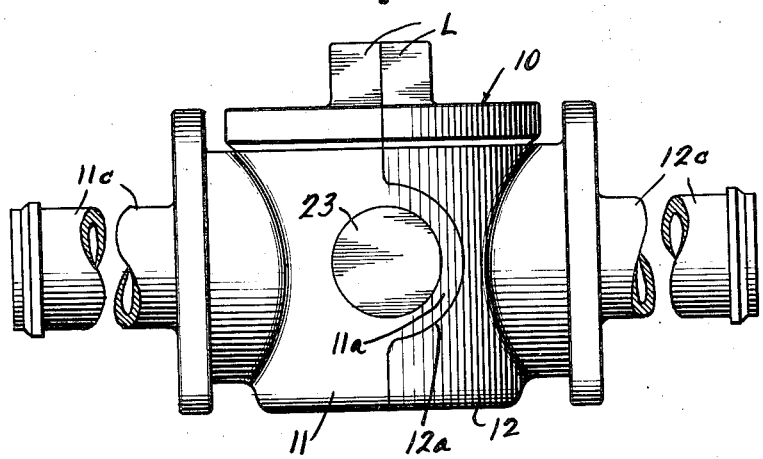
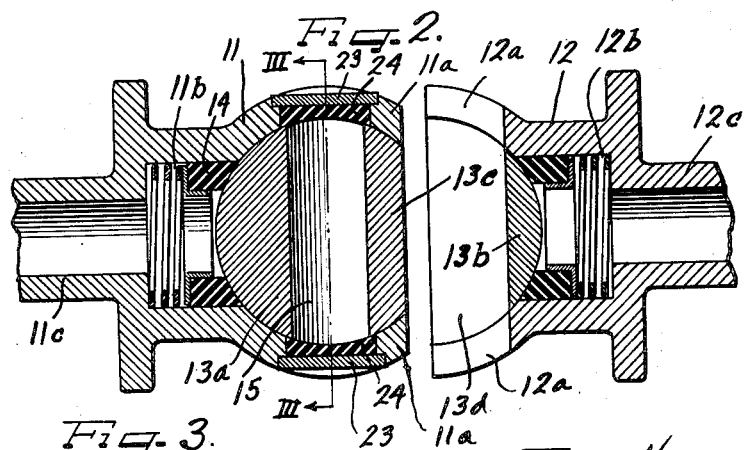
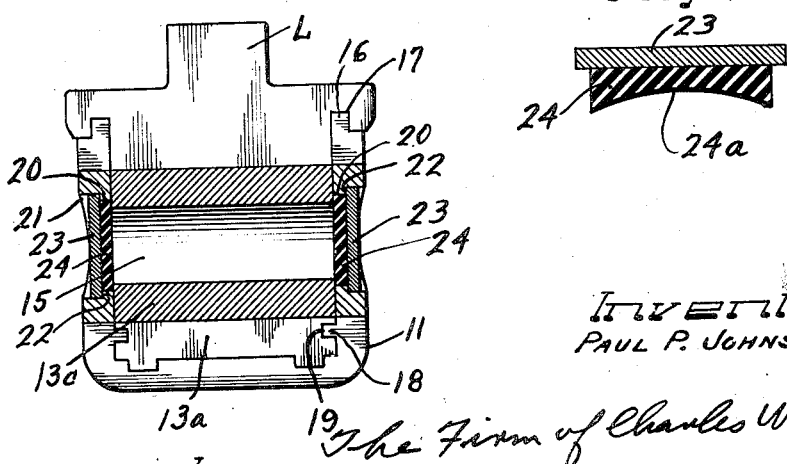
Inventor
PAUL P. JOHNSON
by The Firm of Charles W. Hills
Attys.

Patented May 27, 1947

2,421,332

UNITED STATES PATENT OFFICE 2,421,332

QUICK DISCONNECT COUPLING

Paul P. Johnson, Willoughby, Ohio, assignor to Thompson Products, Inc., Cleveland, Ohio, a corporation of Ohio Application May 16, 1945, Serial No. 594,070

6 Claims. (Cl. 284—4)

1

This invention relates to detachable valved couplings wherein a conduit passage of a valve is sealed in disconnected position as well as in connected position.

Specifically this invention deals with couplings wherein coupling boxes are connected in fluid flow communication by a split plug valve, are sealed in disconnected relation by the pieces of the plug valve, and are equipped with additional seals for preventing drainage of fluid from the plug valve when the coupling boxes are disconnected.

The couplings of this invention are of the type disclosed in the Hufferd Patent No. 2,326,143, dated August 10, 1943. In such couplings a multipiece plug-type valve is rotatably mounted in a chamber defined by mating ported coupling boxes. The valve has a conduit portion joining the ports of the coupling boxes in full fluid flow communication when the valve is rotated to connect the coupling boxes. However, when the valve is rotated to permit separation of the coupling boxes and to seal the ports with pieces of the valve, the conduit passage of the valve may contain appreciable amounts of liquid or other fluid which tends to leak from the conduit passage, thereby forming a fire hazard and resulting in loss of fluid.

In accordance with this invention, seals are carried by the coupling box which retains the conduit-defining portion of the plug valve even when the coupling boxes are in disconnected relation. These seals close the ends of the conduit, thereby retaining whatever fluid might remain in the conduit passage, even when the coupling is in disconnected position.

It is, then, an object of this invention to provide seals for the conduit passages of plug valves in quick disconnect couplings of the type disclosed in the Hufferd Patent 2,326,143.

Another object of this invention is to provide a quick disconnect coupling which does not result in loss of fluid flowed through the coupling even when the coupling is in disconnect position.

A still further object of this invention is to provide a quick disconnect coupling with seals for the plug valve of the coupling.

A further object of the invention is to provide a coupling with a movable conduit section that is sealed when the coupling is disconnected.

A specific object of the invention is to provide a coupling box with seal-carrying ears for closing the ends of a conduit which is movably carried by the coupling box.

Other and further objects of the invention will be apparent to those skilled in the art from the following detailed description of the annexed sheet of drawings which, by way of preferred example, illustrates one embodiment of the invention.

On the drawings:

Figure 1 is a broken side elevational view of a coupling according to this invention.

Figure 2 is a horizontal cross-sectional view taken through the coupling of Figure 1 but showing the parts in disconnected position.

Figure 3 is a vertical cross-sectional view taken along the line III—III of Figure 2.

Figure 4 is an enlarged vertical cross-sectional view of one of the seals for the coupling of Figures 1 to 3.

As shown on the drawings:

In Figure 1 the reference numeral 10 designates generally a quick disconnect coupling according to this invention. As shown in Figures 1 and 2 the coupling 10 is composed of a male coupling box 11 and a female coupling box 12 which, when mated together, form an open-topped closed-bottomed cylindrical cup or chamber receiving a cylindrical plug valve composed of a male conduit section 13a and a female section 13b.

The male coupling box 11 has opposed fragmental circular ears 11a, 11a on the side walls thereof fitting into complementary fragmental circular recesses 12a, 12a of the female coupling box 12.

The coupling box 11 has a port 11b joining the cylindrical chamber portion thereof with a conduit nipple portion 11c. The female coupling box has a similar port 12b joining the cylindrical chamber portion thereof with a conduit nipple portion 12c. Spring-pressed seals 14 are provided in the ports to sealingly engage the side wall of the cylindrical valve composed of the valve pieces 13a and 13b for sealing the ports when the valve pieces are in disconnected position as shown in Figure 2.

The male valve piece 13a has a conduit section 13c which is adapted to seat in a recess 13d of the female plug piece 13b when the coupling boxes are brought together into mating relation. This conduit section 13c has a conduit passage 15 therethrough for joining the ports 11b and 12b when the coupling boxes 11 and 12 are mated together and the valve is rotated 90° from the position shown in Figure 2. Turning lugs L are provided on each valve piece as shown in Figures 1 and 3 to be engaged by a tool for rotating the valve.

As best shown in Figure 3, the coupling boxes have tongues 16 around the tops thereof seated in grooves 17 of the valve pieces. The tongues 16 of each coupling box form a complete circle when the boxes are mated together. The grooves 17 of each valve piece form a complete circular groove when the valve pieces are mated together. Similar interfitting tongues and grooves 18 and 19 are provided in the bottom portions of the coupling boxes and valve pieces. These tongues and grooves hold the male valve piece 13a in the male coupling box 11 and the female valve piece 13b in the female coupling box 12 when the valve is in disconnect position shown in Figure 2 and, when the valve is rotated to connect position, portions of the grooves of both valve pieces receive portions of the tongues of both coupling boxes to hold the coupling boxes in coupled-together relation.

In accordance with this invention the ears 11a of the male coupling box 11 have apertures 20 therein counterbored in the outer faces thereof as at 21 to provide shoulders 22. These apertures are aligned with the ends of the conduit passage 15 when the male valve section is in disconnected position as shown in Figures 2 and 3.

Metal plugs 23 are pressed into the counterbores 21 to be bottomed on the shoulders 22 of the apertures 20. These plugs carry resilient seals such as rubber disks 24. These disks 24 project through the apertures 20 and have cylindrically concave faces 24a mating with the cylindrical wall of the plug valve. When the plug valve is rotated to disconnect position, the conduit passage 15 is effectively sealed at the ends by the seals 24. When the coupling boxes are mated together and the valve is rotated to coupling position, the ends of the conduit passage 15 are sealed by the seals 14 and fluid can flow freely between the ports 11b and 12b. Some of this fluid, however, may remain in the conduit passage 15 when the valve is rotated to disconnect position and, if the conduit passage were unsealed, this fluid could leak out of the passage. The seals 24, however, effectively prevent this leakage.

From the above descriptions it should be understood that this invention provides quick disconnect couplings which have a multi-piece valve for connecting coupling boxes in fluid flow relation, for disconnecting the coupling boxes in sealed relation, and for preventing leakage out of the valve even when it is in disconnect position.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A coupling comprising a pair of complementary parts having ports therein, a multi-piece valve rotatably mounted in both of said parts to detachably connect the same and join the ports in fluid flow communication, means for retaining a piece of said valve in each part for sealing the ports when the parts are disconnected, and seals for the valve holding fluid in the valve when it is in disconnect position.

2. In a device for alternately connecting and sealing spaced ends of conduits including a valve member split into parts adapted to seal said conduit ends and a conduit section in one part of said valve adapted to interconnect said conduit ends, the improvement of seals for closing the ends of said conduit section of the valve part when the section is in disconnected position.

3. In a quick disconnect coupling including ported mating coupling boxes with interfitting ears and recesses, a split plug rotatably mounted in said coupling boxes, one portion of said plug having a conduit passage therethrough for joining the ports of the coupling boxes in fluid flow communication, each plug portion having a surface for closing the ports of the coupling boxes in disconnect relation, and port seals acting on said plug to prevent leakage out of the ports when the plug is rotated to close the ports and to prevent leakage between the conduit passage of the plug and the ports when the plug is rotated to join the ports in flow communication, the improvement of seals carried by said ears of said one coupling box for sealing the ends of said conduit passage when the plug portion is rotated to disconnect position.

4. A quick disconnect coupling comprising a pair of mating coupling boxes cooperating to define an open-topped closed-bottomed chamber with opposed ports in the side walls thereof, one of said coupling boxes having recesses in the mating face thereof, the other of said coupling boxes having ears projecting into said recesses when the coupling boxes are mated together, a split valve rotatably mounted in the chamber of said coupling boxes and having a conduit passage in one part thereof for joining the ports in fluid flow communication, port seals in said boxes acting on said valve to seal the ports when the valve closes the ports and to prevent leakage between the ports and conduit passage of said one valve part when the valve is rotated to connect the boxes and ports, and seals carried by said ears for closing the ends of said conduit passage of said one valve part when the valve is rotated to disconnect position.

5. In a quick disconnect coupling a male coupling box having ears on the side walls thereof, a valve rotatably mounted in said coupling box having a conduit passage therethrough, and seals carried by said ears for closing the ends of said conduit passage.

6. In a quick disconnect coupling having a coupling box rotatably supporting a valve with a fluid-flow conduit therethrough, said coupling box having diametrically opposed apertures therein, plugs closing said apertures, and seals carried by said plugs for sealing the ends of said conduit when said valve is in disconnect position.

PAUL P. JOHNSON.

REFERENCES CITED

The following references are of record in the file of this patent:

UNITED STATES PATENTS

| Number | Name | Date |
|---|---|---|
| 2,373,925 | Townhill | Apr. 17, 1945 |
| 1,817,258 | Klinger | Aug. 4, 1931 |
| 2,117,456 | Schellin | May 17, 1938 |